(12) United States Patent
Shirashige et al.

(10) Patent No.: US 6,467,142 B1
(45) Date of Patent: Oct. 22, 2002

(54) METHOD FOR MANUFACTURING CHIP CAPACITOR

(75) Inventors: Michihiro Shirashige, Kobe (JP); Hidemasa Ichiki, Suita (JP); Koichi Baba, Higashiosaka (JP); Kazuto Okada, Kobe (JP); Takayoshi Oka, Suita (JP)

(73) Assignee: Matsuo Electric Company Limited, Toyonaka (JP)

( * ) Notice: Subject to any disclaimer, the term of this patent is extended or adjusted under 35 U.S.C. 154(b) by 344 days.

(21) Appl. No.: 09/594,424

(22) Filed: Jun. 15, 2000

(30) Foreign Application Priority Data

Jun. 18, 1999 (JP) .......................................... 11-172738

(51) Int. Cl.$^7$ ................................................ H01G 7/00
(52) U.S. Cl. .................... 29/25.42; 29/592.1; 29/25.03; 29/832; 29/417; 361/301.1
(58) Field of Search ............................ 29/25.42, 25.41, 29/592.1, 25.01, 25.02, 25.03, 832, 835, 838, 839, 840, 841, 412, 413, 416, 417, 739, 740; 361/301.1, 301.4, 301.5; 174/52.1

(56) References Cited

U.S. PATENT DOCUMENTS

| | | | |
|---|---|---|---|
| 3,781,976 A | * | 1/1974 | Tomiwa ........................ 29/583 |
| 5,716,420 A | * | 2/1998 | Kuriyama ..................... 29/25.03 |
| 6,346,127 B1 | * | 2/2002 | Kuriyama ..................... 29/25.03 |
| 6,368,363 B1 | * | 4/2002 | Kobatake et al. .......... 29/25.03 |

FOREIGN PATENT DOCUMENTS

| | | |
|---|---|---|
| JP | 55-47449 B2 | 11/1980 |
| JP | 1-29050 B2 | 6/1989 |

* cited by examiner

*Primary Examiner*—David J. Walczak
(74) *Attorney, Agent, or Firm*—Duane Morris LLP

(57) ABSTRACT

A terminal frame including plural pairs of terminal sections arranged in rows and columns is prepared. Each pair includes a flat anode terminal section and a flat cathode terminal section disposed in the same plane with their tip ends being spaced from and facing each other. Plural capacitor elements are prepared. Each capacitor element has a cathode layer on substantially entire outer surface thereof, and a tantalum lead. The capacitor elements are placed on the frame. The tantalum lead of each capacitor element is coupled to one major surface of the anode terminal section of one pair of terminal sections, with the cathode layer of that capacitor element coupled to one major surface of the cathode terminal section of the same pair. The frame with the capacitor elements mounted thereon are coated with resin in such a manner that all of the capacitor elements are encapsulated in the resin, while at least a portion of the opposite major surface of each anode terminal section and at least a portion of the opposite major surface of each cathode terminal section are left exposed. After that, the frame and the resin encapsulation are cut to separate the capacitor elements with the anode and cathode terminal sections into individual chip capacitors.

3 Claims, 7 Drawing Sheets

METHOD FOR MANUFACTURING CHIP CAPACITOR

This invention relates to a method for manufacturing a chip capacitor, e.g. a chip-type tantalum capacitor.

BACKGROUND OF THE INVENTION

Japanese Examined Patent Publication (KOKOKU) No. SHO 55-47449 B2 published on Nov. 29, 1980 and Japanese Examined Patent Publication (KOKOKU) No. HEI 1-29050 B2 published on Jun. 7, 1989, both of which are owned by the assignee of the present application, disclose a method of manufacturing chip-type tantalum capacitors.

A According to the method disclosed in Japanese Examined Patent Publication No. SHO 55-47449 B2, a terminal frame including pairs of cathode and anode terminal portions disposed spaced from each other along a line are arranged in rows and columns is prepared. Capacitor elements each including a cathode layer disposed to cover the outer surface of the capacitor element and an anode lead extending from one end thereof are prepared. The cathode layer of each capacitor element is connected to the cathode terminal portion of an associated one of the cathode-anode terminal portion pairs of the terminal frame, with the anode lead of that capacitor element connected to the anode terminal portion in the same pair. Then, all the capacitor elements, the cathode terminal portions and the anode terminal portions in respective rows are molded in a resin. Thus, the cathode and anode terminal portions except those portions connected to the frame are embedded in the resin. After that, the cathode and anode terminal portions are separated from the terminal frame, and, also, the resin is cut along lines between adjacent ones of the capacitor elements to thereby complete chip-type capacitors.

According to a method disclosed in Japanese Examined Patent Publication No. HEI 1-29050 B2, chip-type capacitors are manufactured by punching plural pairs of generally rectangular anode and cathode terminal portions arranged in line in an electrically conductive metal sheet, with an opening disposed between each pair of anode and cathode terminal portions. The anode and cathode terminal portions are pushed upright with the bases of the respective terminal portions connected to the metal sheet. Respective sides of the raised rectangular terminal portions are inwardly bent. Capacitor elements are disposed between respective pairs of raised terminal portions. Metal chips welded on tip ends of anode leads of respective capacitor elements are connected to inner surfaces of respective ones of the inwardly bent anode terminal portions, and cathode layers disposed on outer surfaces of respective ones of the capacitor elements are connected to inner surfaces of respective ones of the inwardly bent cathode terminal portions. Resin is placed in the spaces between respective anode and cathode terminal portion pairs to cover the capacitor elements disposed between them. After that, the anode and cathode terminal portions are separated from the conductive metal sheet to complete chip-type capacitors.

According to Japanese Examined Patent Publication SHO 55-47449 B2, resin molding is provided for each row of capacitor elements. In addition, since the cathode and anode terminal portions are embedded in the resin, they occupy a relatively large amount of the volume of the chip capacitor mold, which impedes downsizing of such chip capacitor.

According to Japanese Examined Patent Publication No. HEI 1-29050, both anode and cathode terminal portions have parts located below the capacitor element. However, since the anode terminal is at a location remote from the cathode layer, it is not possible to reduce the length of the chip capacitor.

Therefore, an object of the present invention is to provide a method of manufacturing chip capacitors in a small size.

SUMMARY OF THE INVENTION

According to one embodiment of the present invention, a terminal frame is first prepared. The terminal frame includes plural pairs of terminal sections arranged in rows and columns. Each terminal section pair includes a flat anode terminal section and a flat cathode terminal section, which are arranged in the same plane with their tip ends facing to each other with a spacing disposed between them. The terminal frame may be formed by etching or punching an electrically conductive material, e.g. a metal sheet or metal foil.

A plurality of capacitor elements are prepared. Each capacitor element includes a cathode layer covering the outer surface of the capacitor element, and an anode lead extending outward from the element. The cathode layer includes a flat surface portion at least in its bottom surface. The capacitor element may have a shape of generally rectangular parallelepiped or a semicylindrical shape. At least the bottom surface of the capacitor element is flat. The cathode layer is present also on this flat bottom surface. The anode lead extends out of an end of the capacitor element and may be columnar or planar in shape. Alternatively, it may have a shape of foil.

One such capacitor element is disposed in association with each terminal section pair. Then, the anode lead of the capacitor element is electrically and mechanically connected to first one of major surfaces of the anode terminal section of the terminal section pair. The cathode layer of the capacitor element is connected to a first major surface of the cathode terminal section of the same terminal section pair which is located in substantially the same plane as the first major surface of the anode terminal section. Then, the terminal frame and the capacitor elements mounted on it are entirely covered with a resin so as to embed all of the capacitor elements, leaving exposed at least a portion of the second, opposite major surface of each anode terminal section and at least a portion of the second, opposite major surface of each cathode terminal section, to thereby form a capacitor assembly of chip capacitors each including a capacitor element having an anode lead and a cathode layer connected to associated anode and cathode terminal sections and a resin coating covering them. The covering may be carried out by means of a molding machine capable of molding the entire terminal frame and all of the capacitor elements, e.g. a transfer mold machine with a cavity capable of accommodating the terminal frame in its entirety, or a screen printing machine, or an injection mold machine. The capacitor assembly is cut, by means of, for example, a dicing machine, into individual chip capacitors.

The capacitor assembly may be separated into individual chip capacitors by forming slits having a width between adjacent chip capacitors of the capacitor assembly. If the capacitor assembly is separated by forming single thin cut lines in the terminal frame between adjacent chip capacitors, a larger amount of resin will be left on the resulting individual chip capacitors, so that the chip capacitors cannot be small in size. By separating the capacitor assembly by forming slots with some width, the amount of resin to be left on the resulting chip capacitors can be reduced, which helps further downsizing of chip capacitors.

When disposing respective capacitor elements in association with anode and cathode terminal sections, an insulator may be disposed on the tip end of each anode terminal section, and the cathode layer of each capacitor element is placed in contact with the tip end of the associated anode terminal section and with the associated cathode terminal section. The insulator may be an insulating tape or insulating paint, e.g. insulating ink. In addition, the proximal end of each anode terminal section may be disposed in the vicinity of the tip end of the anode lead of the associated capacitor element.

DETAILED DESCRIPTION OF THE INVENTION

Figure 1A:
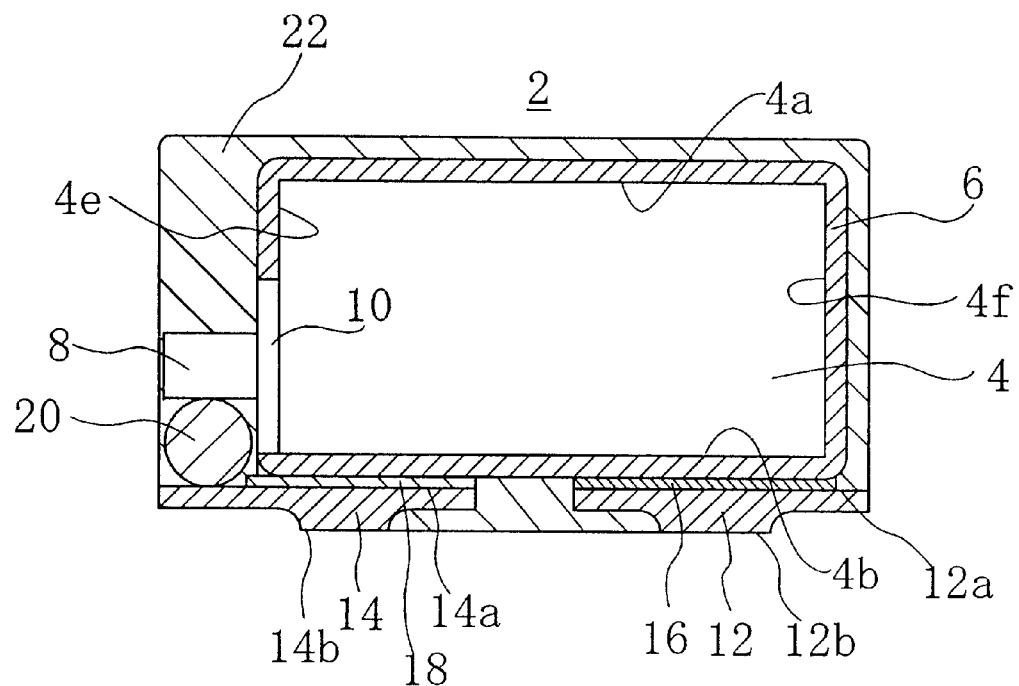
FIG. 1A is a longitudinal cross-section view of a chip-type tantalum capacitor made in accordance with the present invention.
Figure 1B:
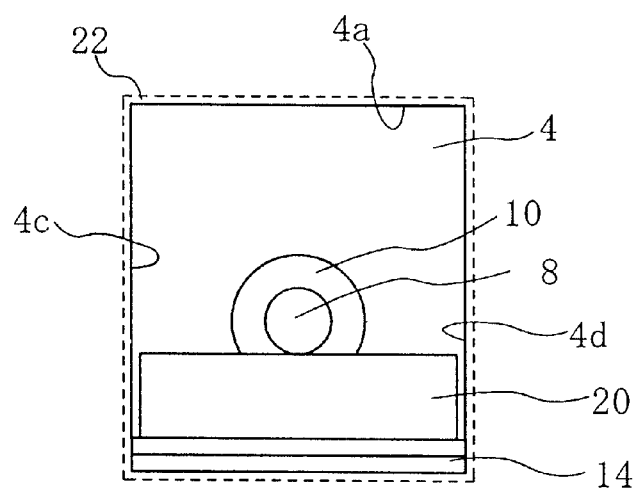
FIG. 1B is a schematic front elevational view illustrating a general structure of the capacitor shown in FIG. 1A with some portions removed.

FIGS. 1A and 1B schematically show a chip-type tantalum capacitor made by a method in accordance with an embodiment of the present invention.

A chip capacitor 2 includes a capacitor element, e.g. a tantalum capacitor element 4, which may be prepared in accordance with any known process. The capacitor element 4 is generally rectangular parallelepiped and has a top surface 4a, a bottom surface 4b, side surfaces 4c and 4d and end surfaces 4e and 4f. Any other shape may be employed for the capacitor element 4 provided that the bottom surface 4b is flat.

A cathode layer 6 is disposed over the entire outer surface of the capacitor element 4. An anode lead; e.g. a tantalum lead 8 of the capacitor element 4 extends out of the end surface 4e, and a plastic washer 10 is fitted over the tantalum lead 8 and is in surface contact with the end surface 4e of the capacitor element 4. Thus, there is provided no cathode layer on the end surface 4e at the portion which the plastic washer 10 is in contact with. The tantalum lead 8 is pillar-shaped. For example, it may be cylindrical. A planar cathode terminal 12 and a planar anode terminal 14 are disposed beneath the bottom surface 4b of the capacitor element 4.

The cathode terminal 12 is located offset toward the end surface 4f with its outer end located near the end surface 4f. In the illustrated example, it is located slightly outward of the end surface 4f. The inner end of the cathode terminal 12 is located slightly offset from the longitudinal center of the capacitor element 4 toward the end surface 4f. One of two opposing major surfaces, 12a, of the cathode terminal 12 is disposed close to and substantially in parallel with the bottom surface 4b of the capacitor element 4 and is connected to the cathode layer 6 on the bottom surface 4b by means of electrically conductive 10 adhesive, e.g. silver paste 16.

Similarly, the anode terminal 14 is disposed at a location offset toward the end surface 4e. The outer end of the anode terminal 14 is close to the outer end of the tantalum lead 8. In the illustrated example, it is slightly outward of the outer end of the tantalum lead 8. The inner end of the anode terminal 14 is slightly offset from the longitudinal center of the capacitor element 4 toward the end surface 4e. The inner end of the anode terminal 14 is spaced from the inner end of the cathode terminal 12.

One of two opposing major surfaces, namely, a major surface 14a, of the anode terminal 14 is disposed close to the bottom surface 4b of the capacitor element 4 and is substantially in the same plane as the major surface 12a of the cathode terminal 12. The major surface 12a is secured to the cathode layer 6 on the bottom surface 4b of the capacitor element 4 with an insulator, e.g. a piece of insulating tape 18 disposed therebetween. Thus, the anode terminal 14 is secured to but insulated from the cathode layer 6.

A connector, e.g. a tantalum wire 20, is disposed between and in contact with the tantalum lead 8 and a portion of the anode terminal 14. The tantalum wire 20 has a columnar or cylindrical shape and extends perpendicular to the length of the tantalum lead 8. The tantalum wire 20 is connected to the tantalum lead 8 and the anode terminal 14 by welding.

The capacitor element 4, the tantalum lead 8, the tantalum wire 20, a portion of the anode terminal 14 and a portion of the cathode terminal 12 are covered by or encapsulated in an encapsulation 22 of resin, e.g. epoxy. As is seen from FIG. 1A, the encapsulation 22 is such that a larger portion of the other major surface 14b (i.e. the surface opposite to the major surface 14a) of the anode terminal 14 and a larger portion of the other major surface 12b (i.e. the surface opposite to the major surface 12a) of the cathode terminal 12 are left exposed.

Further, as is seen from FIG. 1A, the cathode terminal 12 and the anode terminal 14 are planar elements, and they lie only beneath the capacitor element 4 and do not extend on the lateral sides of the element 4. Accordingly, the proportion of the volume occupied by the cathode and anode terminals 12 and 14 to the volume of the entire chip capacitor 2 can be small, so that the chip-type tantalum capacitor 2 can be small in size. Furthermore, since the inner end of the anode terminal 14 extends beneath the capacitor element 4, the length of the anode terminal 14 extending outward of the end surface 4e of the capacitor element 4 can be short, which also makes it possible to downsize the chip capacitor 2. In addition, since the anode terminal 14 has a relatively large area, reliable soldering of the chip capacitor 2 to a printed circuit board is provided.

Figure 2:
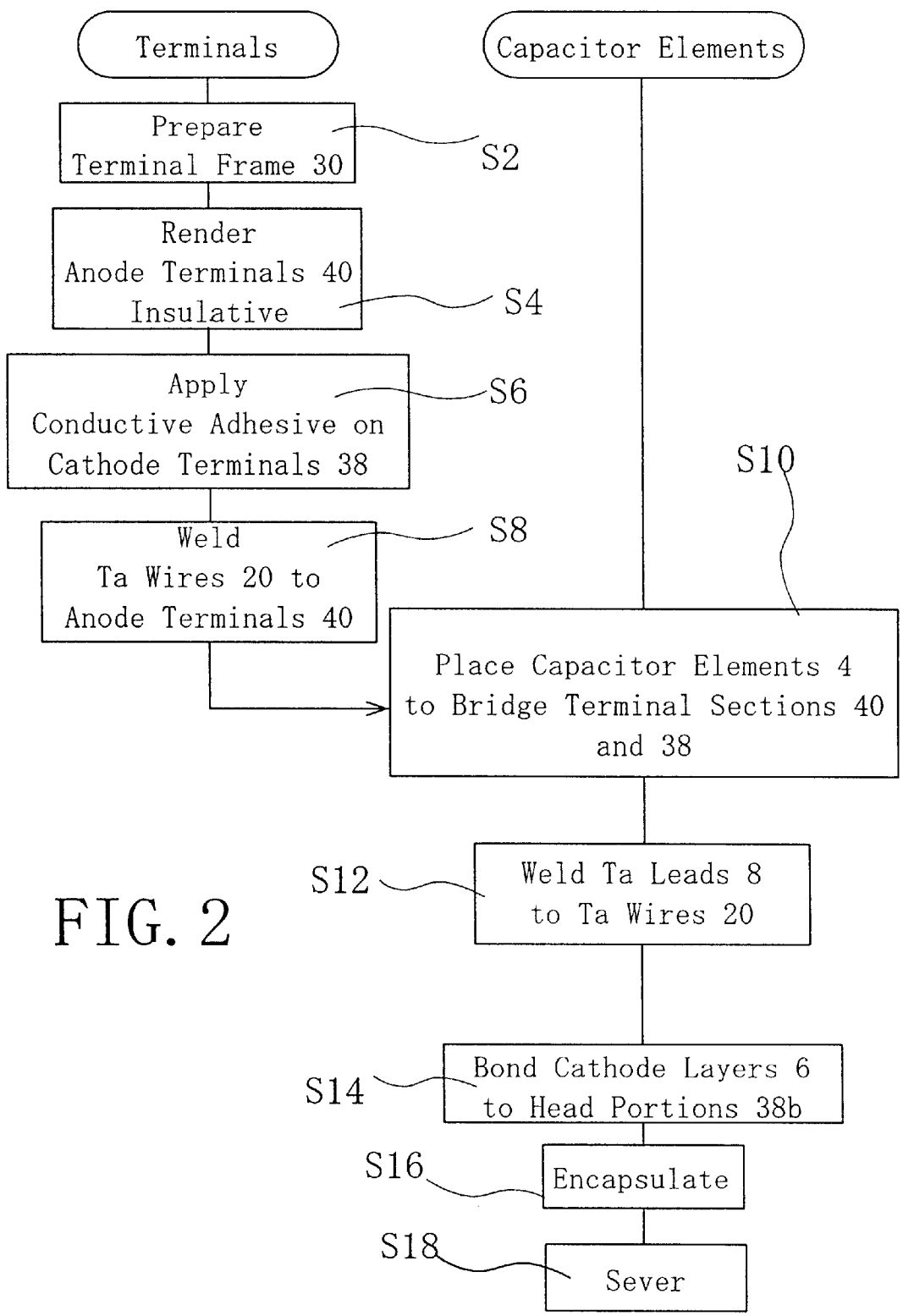
FIG. 2 is a flow chart illustrating a process of manufacturing chip-type tantalum capacitors according to an embodiment of the present invention.

The chip-type tantalum capacitor 2 may be manufactured, for example, in the following manner. FIG. 2 is a flow chart exemplifying how to manufacture the capacitor 2.

Figure 3:
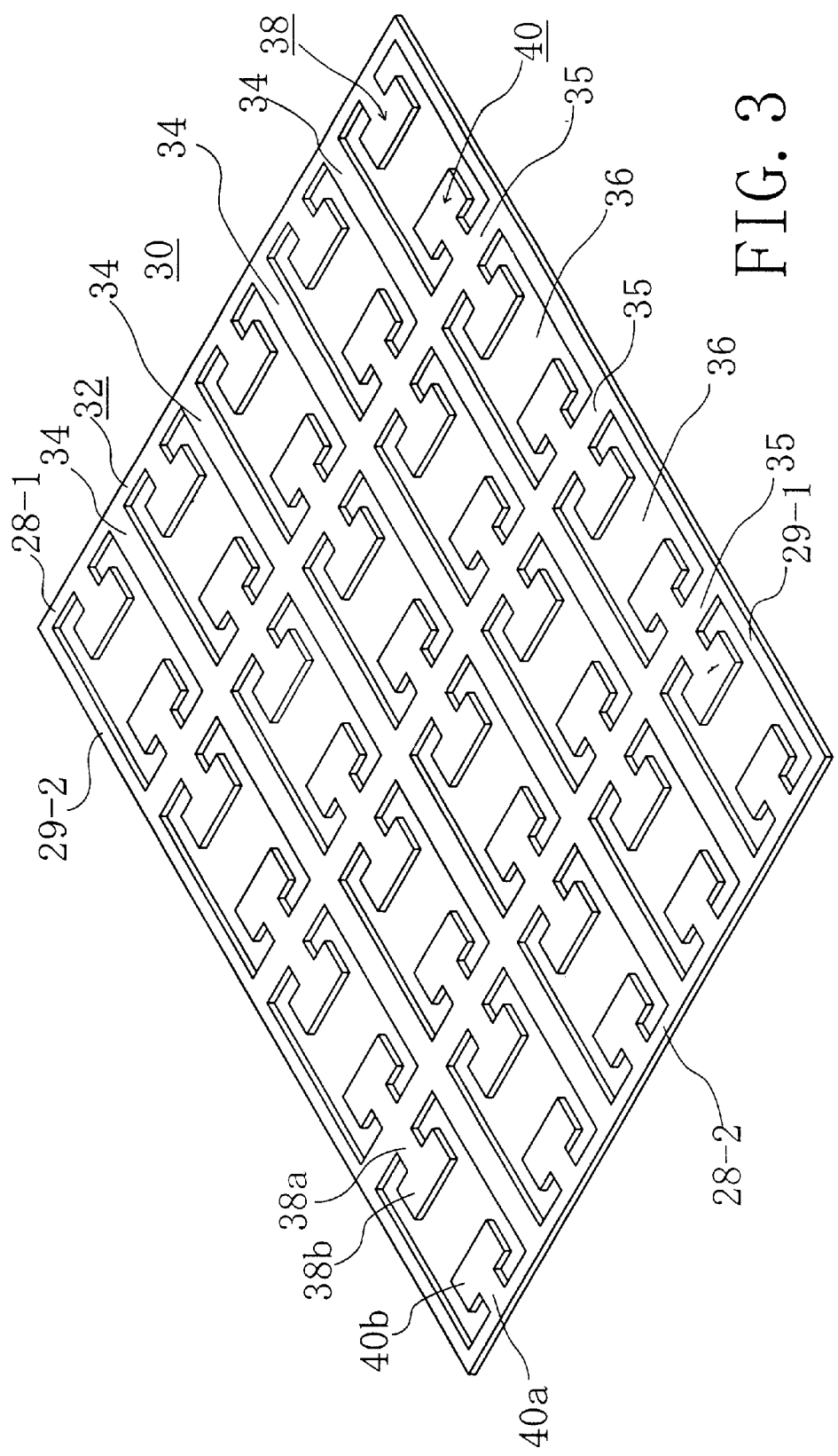
FIG. 3 is a perspective view of a terminal frame used in the manufacturing process shown in FIG. 2.

First, a terminal frame 30 is prepared (STEP S2). The terminal frame 30 includes an outer framing 32 as shown in FIG. 3. Within the boundary defined by the framing 32, a plurality of strap-like members 34 spaced from each other by a predetermined distance extend in parallel between a pair of opposing parallel longer sides 29-1 and 29-2 of the framing 32, and a plurality of similar strap-like members 35 spaced from each other by a predetermined distance extend in parallel between the other pair of opposing parallel shorter sides 28-1 and 28-2 of the framing 32 in the direction perpendicular to the strap-like members 34. Thus, a plurality of rectangular windows 36 are formed in matrix by the strap-like members 34 and 35 and the framing 32.

A terminal structure pair including one cathode terminal section 38 and one anode terminal section 40 is provided in each window 36. Each of the cathode terminal sections 38 extends into an associated window 36 from one of the strap-like members 35 or the shorter side 28-1 of the outer framing 32. Each cathode terminal section 38 has a neck portion 38a and a generally rectangular, enlarged head portion 38b formed integral with the distal end of the neck portion 38a. Similarly, each of the anode terminal sections 40 extend from one of the strap-like members 35 or the other shorter side 28-2 into an associated window 36 in the direction toward the associated cathode terminal section 38. Each anode terminal section 40 has a neck portion 40a and a generally rectangular, enlarged head portion 40b formed integral with the distal end of the neck portion 40a.

Thus, one cathode terminal section 38 and one anode terminal section 40 are in each window 36. The center lines of the neck portions 38a and 40a in each window 36 extending in parallel with the longer sides 29-1 and 29-2 of the outer framing 32, are coincident with each other and extend through the midpoints of the opposing shorter edges of that window 36. The center lines of the head portions 38b and 40b in each window 36 extending in parallel with the longer sides 29-1 and 29-2 are coincident with the center lines of the associated neck portions 38a and 40a. The distal edges of the head portions 38b and 40b are spaced from each other by a predetermined distance.

The terminal frame 30 may be prepared by, for example, punching or etching an electrically conductive, thin metal sheet. In FIG. 3, only twenty terminal structure pairs, i.e. twenty cathode terminal sections 38 and twenty anode terminal sections 40, are shown only for an illustrative purpose, but actually several hundreds of terminal structure pairs are formed in one terminal frame 30.

Figure 4:
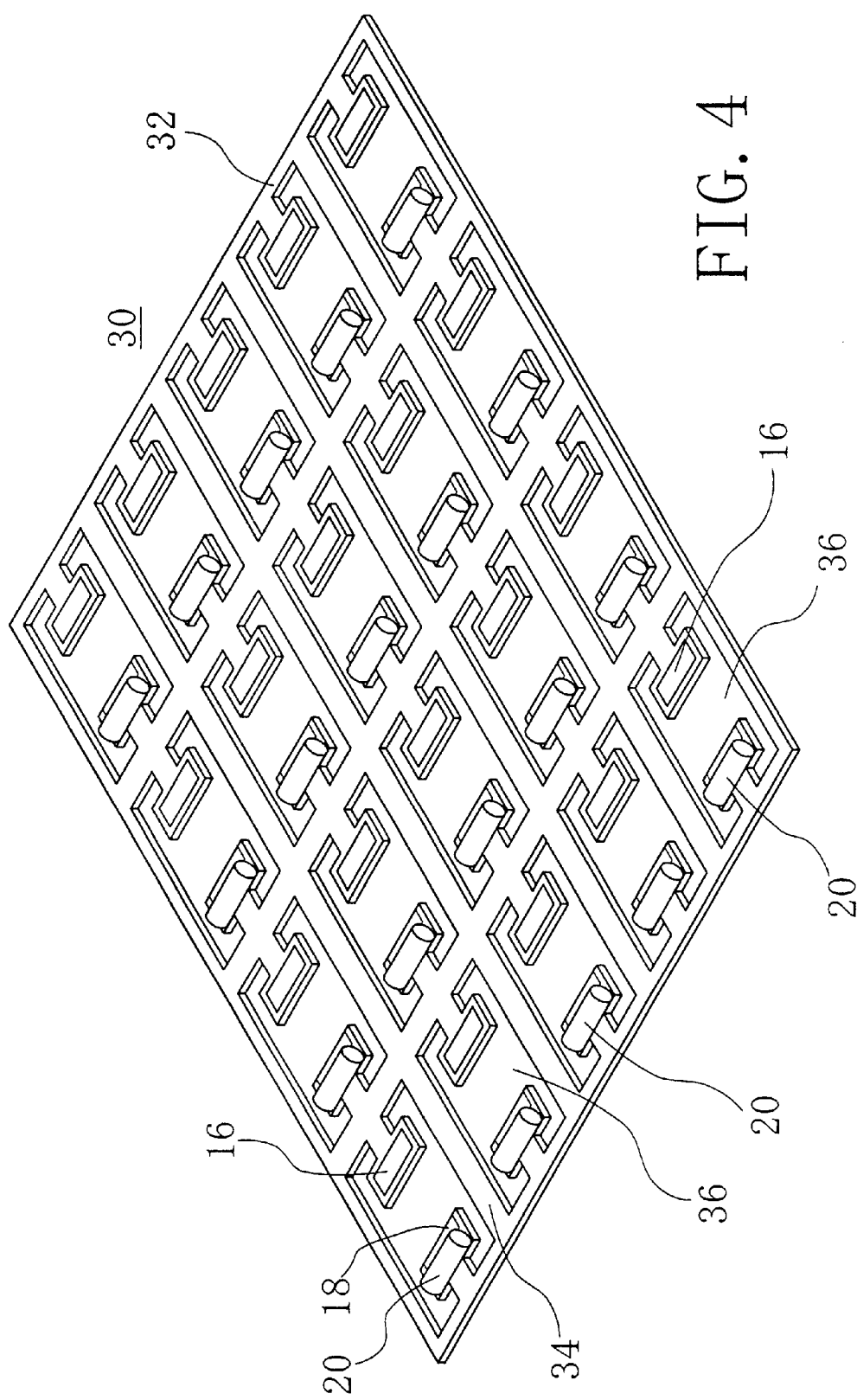
FIG. 4 is a perspective view of the terminal frame shown in FIG. 3 with insulating tape pieces, electrically conductive adhesive, and tantalum leads mounted in place thereon.

In STEP S4 (FIG. 2), the distal end portion of the head portion 40b of each anode terminal section 40 is made insulative by, for example, bonding an insulating tape 18, as shown in FIG. 4. In place of the insulating tape 18, a patch of insulating ink may be screen-printed.

Next, a quantity of electrically conductive adhesive, e.g. silver paste, 16 is applied over a region along a distal edge of the head portion 38b of each cathode terminal section 38 (STEP S6), as shown in FIG. 4. The application of the adhesive may be achieved by screen printing with a screen printing machine or by potting with a high-precision dispenser.

Next, a connector or tantalum wire 20 is welded to the proximal end of the head portion 40b of each anode terminal section 40 (STEP S8). The welded wires 20 are also shown in FIG. 4.

It should be noted that the order of performing STEPs S4, S6 and S8 can be changed.

Along with STEPs S4, S6 and S8, a plurality of capacitor elements 4 are prepared. The capacitor elements 4 may be prepared in any one of suitable known processes, and, therefore, it is not described in detail how to manufacture them.

Figure 5:
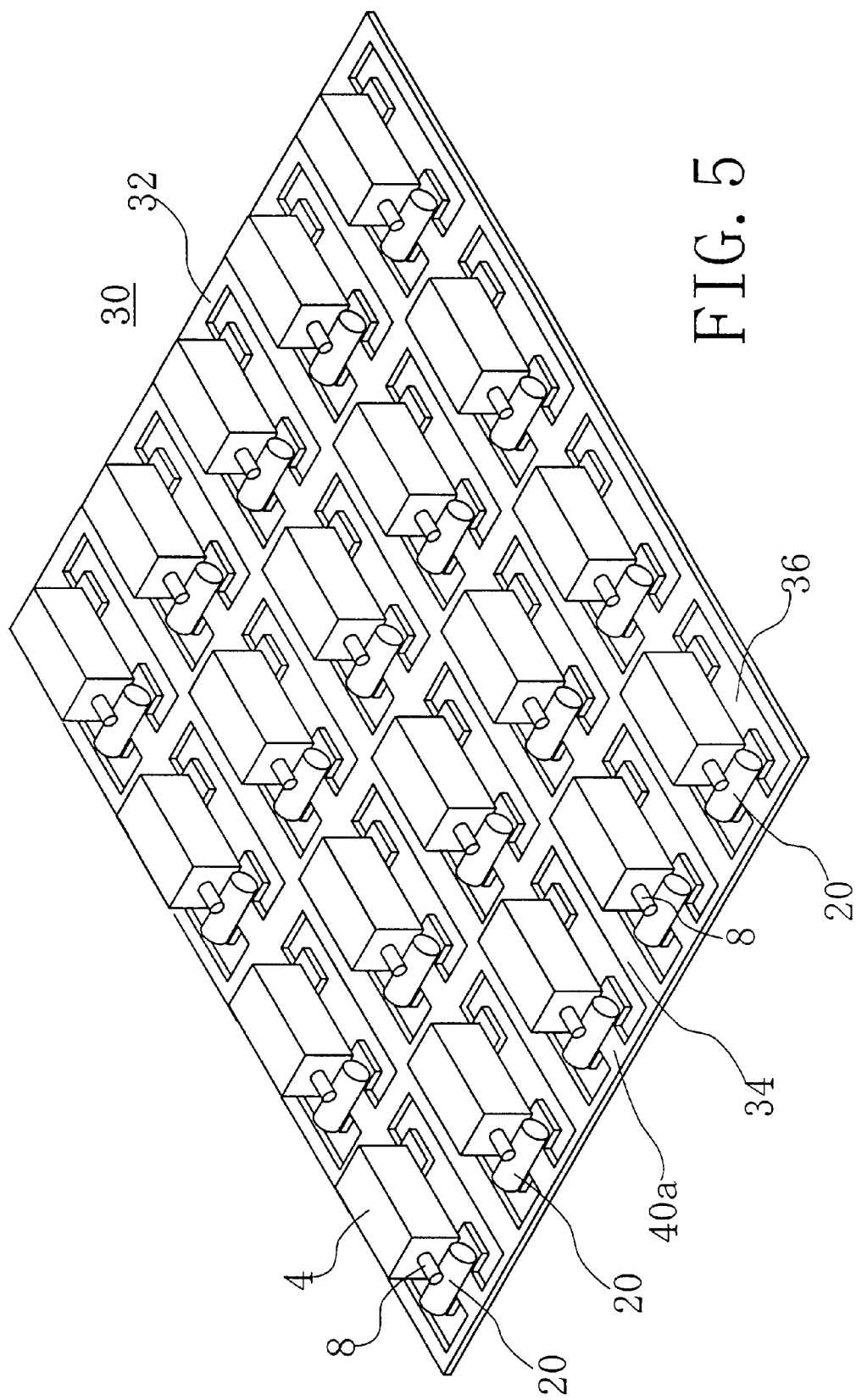
FIG. 5 is a perspective view of the terminal frame shown in FIG. 4, with cathode layers of respective capacitor elements secured by the conductive adhesive and with tantalum leads of the capacitor elements welded to the associated tantalum wires previously mounted on the terminal frame.

Each of the capacitor elements 4 is disposed in such a manner that the anode lead 8 of the capacitor element 4 contacts with the tantalum wire 20 on the associated anode terminal section 40, and that the cathode layer 6 on the bottom surface 4b of that capacitor element 4 is brought into contact with the insulating tape 18 on the head portion 40b of the anode terminal section 40 and with the conductive adhesive 16 applied on the head portion 38b of the associated cathode terminal section 38 (STEP S10) as shown in FIG. 5.

Next, the tantalum leads 8 of the respective capacitor elements 4 are welded to the associated tantalum wires 20 of the anode terminal sections 40 (STEP S12). Also, the cathode layers 6 are made to be bonded to the respective cathode terminal head portions 38b by the conductive adhesive 16 (STEP S14).

After that, the terminal frame 30 is provided with a coating 42 of a resin, e.g. an epoxy resin (STEP S16). The coating 42 is provided by using a machine capable of handling the entire terminal frame 30, e.g. by screen-printing with a screen-printing machine or by transfer molding with a transfer mold machine. The coating is provided in such a manner that the bottom surfaces of the cathode terminal sections 38 and the bottom surfaces of the anode terminal sections 40, which respectively correspond to the major surfaces 14b and 12b of the anode and cathode terminals 14 and 12 of the capacitor element 4 shown in FIGS. 1A and 1B, are located in the same plane and are left exposed.

When transfer-molding is employed for coating the terminal frame 30 with the above-described components, including the capacitor elements 4 placed on the terminal frame 30, all of the capacitor elements 4, the anode terminal sections 40 and the cathode terminal sections 38 are placed in a single cavity. In prior art transfer molding, capacitor elements must be individually placed in separate cavities, which raises the costs for the equipment and requires a long manufacturing time. Furthermore, prior art provides poor dimensional precision, no degree of freedom of dimensions, and low effective use of materials. In contrast, according to the present invention, all of the capacitor elements 4, the anode terminal sections 40 and the cathode terminal sections 38 are placed in a single cavity, and, therefore, such disadvantages seen in prior art can be eliminated.

Figure 6:
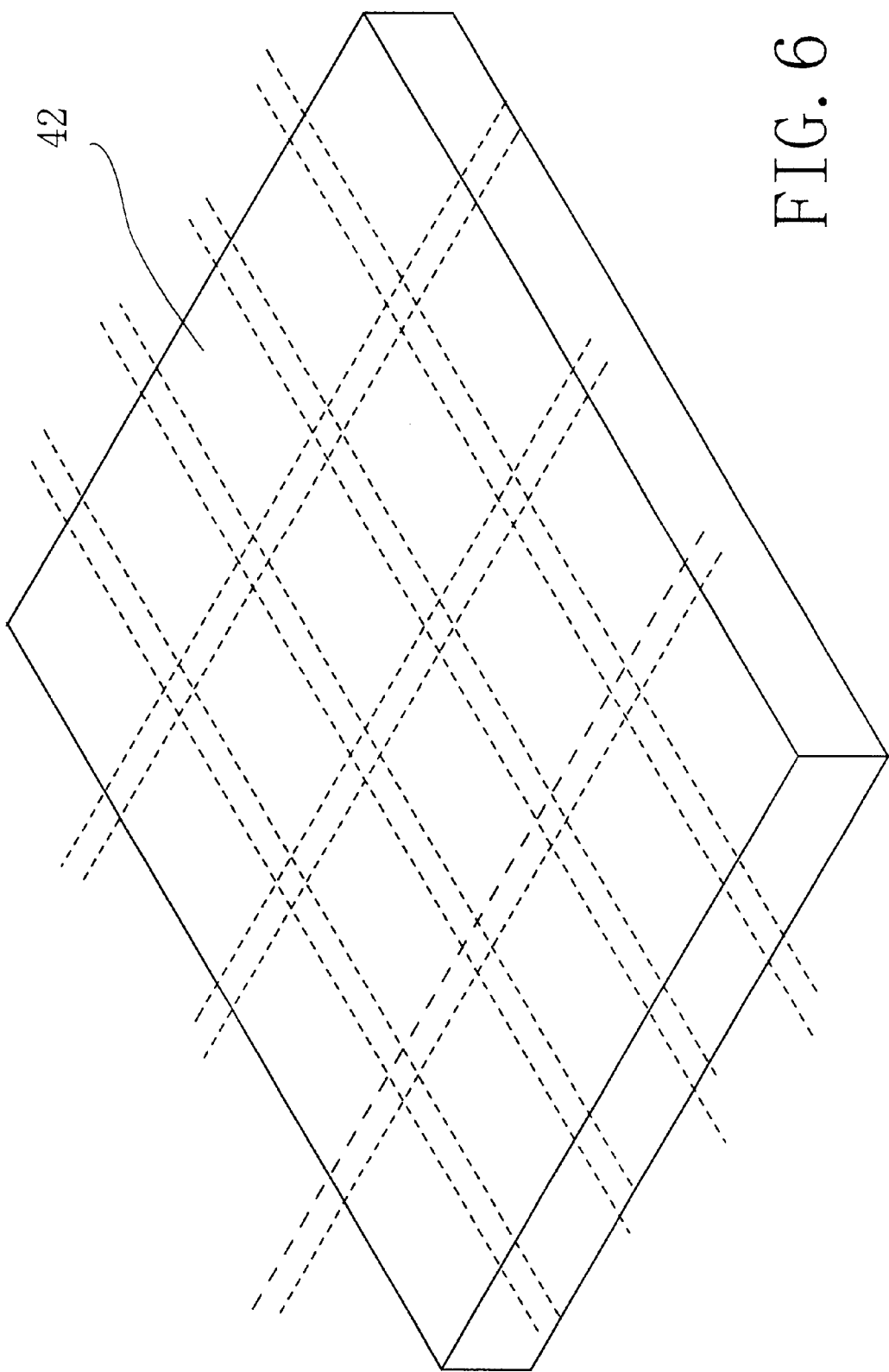
FIG. 6 is a schematic perspective view of a capacitor assembly inclusinf the terminal frame shown in FIG. 5 and a resin covering the terminal frame.

A capacitor assembly including the terminal frame 30 with the capacitor elements 4 mounted thereon provided with the coating 42 is shown in FIG. 6. In case that resin adheres to the bottom surfaces of the cathode and anode terminal sections 38 and 40 (which bottom surfaces are the major surfaces 14b and 12b of the anode and cathode terminals 14 and 12, respectively, of the completed chip capacitor 2), it must be removed by means of, for example, a honing machine or micro-sandblasting machine so that the major surfaces 14b and 12b of the anode and cathode terminals 14 and 12 can remain exposed through the encapsulation 22 or coating 42.

The terminal frame 30 with the capacitor elements 4 and the other components mounted thereon is coated with the resin by screen-printing, the thickness of the resin coating 42 is adjusted by means of a surface grinding machine.

Although the bottom surfaces of the cathode and anode terminal sections 38 and 40 may be kept flat, they may be provided with portions offset toward the respective top surfaces so as to improve the solderability of the completed capacitors 2 to printed circuit boards. Such offset portions can be formed by a dicing machine or micro sandblasting machine.

Figure 7:
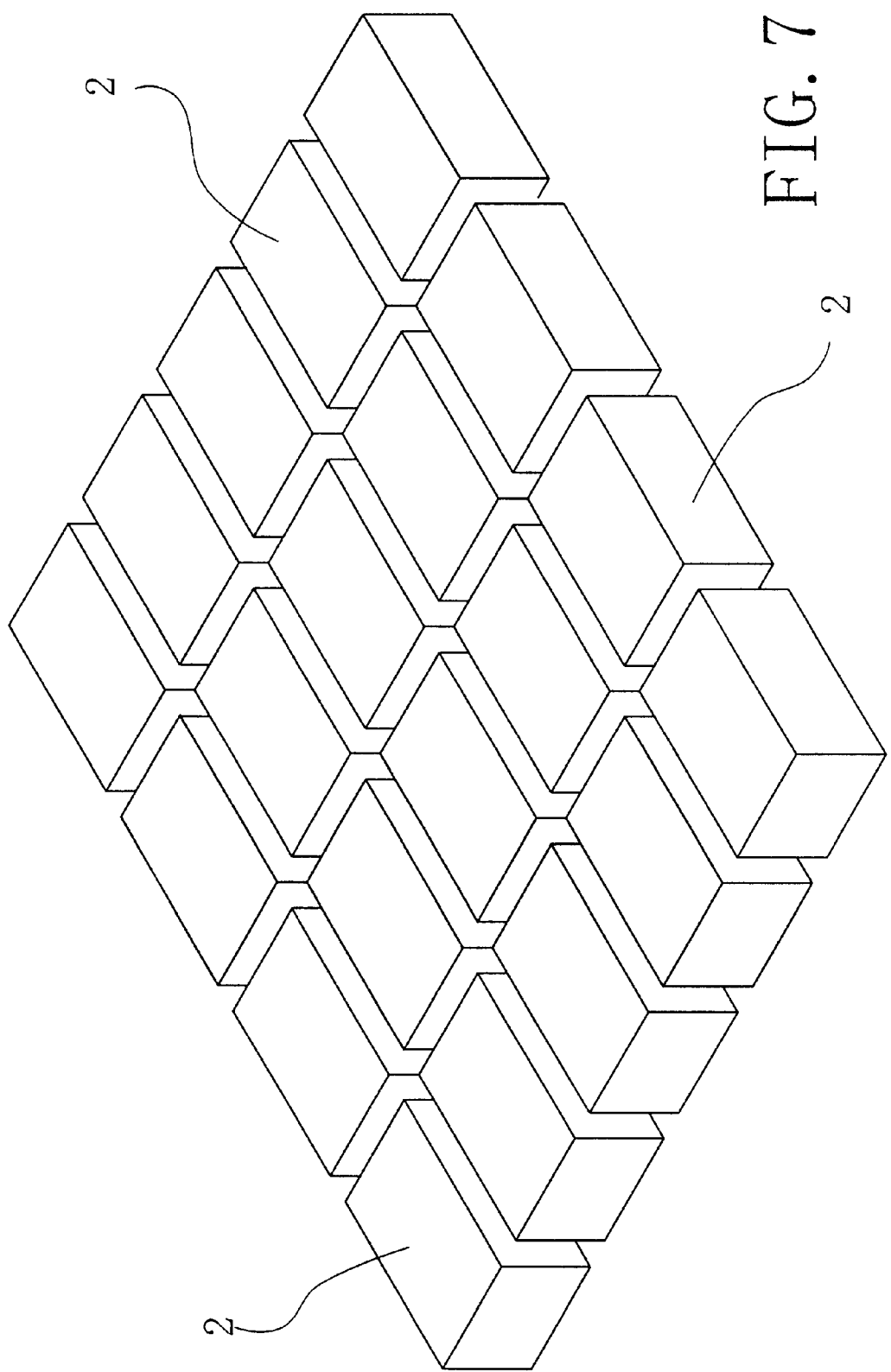
FIG. 7 is a schematic perspective view of the capacitor assembly shown in FIG. 6 after it is cut into individual chip capacitors.

Then, the terminal frame 30 with the capacitor elements 4 mounted thereon, i.e. the capacitor assembly, is severed (Step S18). Thus, the encapsulations 22 are formed from the coating 42. For example, a dicing machine may be used to cut the coated terminal frame 30 with the capacitor elements 4 mounted thereon along horizontally and vertically extending sets of two lines spaced apart from each other as shown dashed in FIG. 6. The dicing machine not only cuts the resin coating 42 but also separates the cathode terminal sections 38 and the anode terminal sections 40 from the outer framing 32 and the strap-like members 34 and 35. When the coating 42 is cut along the two spaced apart line sets, slots are formed between adjacent chip capacitors 2 as shown in FIG. 7. The spacing between the two lines or the width of the slots is as large as possible, but to such an extent that neither the capacitor elements 4 nor the tantalum leads 8 are exposed. Thus, the proportion of the volume of the completed chip capacitor 2 occupied by the encapsulation 22 can be small, which means the completed chip capacitor 2 can be small in size.

After that, the exposed surfaces, including the major surfaces 12b and 14b, of the cathode terminals 12 and the anode terminals 14 of the respective chip capacitors 2 are plated with, for example, solder or tin. The plating of the exposed surfaces of the terminals 12 and 14 facilitates soldering of the chip capacitors 2 to printed circuit boards or the like. In addition, solder can creep up along the sectional or end surfaces of the terminals, so that the chip capacitors 2 can be secured to the boards more reliably. Furthermore, the plating of the sectional end surfaces of the terminals 12 and 14 can prevent rusting of the terminals from the sectional end surfaces. The exposed surfaces of the anode and cathode terminal sections 40 and 38 may be plated prior to the cutting of the coating 42.

In the above-described embodiment, the columnar tantalum wire 20 is used as the connector for connecting the anode terminal section 40 to the tantalum lead 8, but the connector 20 can be of a shape other than columnar shape. Instead of using the separate connector or tantalum wire 20, the portion of the head portion 40b of the anode terminal section 40 which faces the lead 8 may be raised to contact with the lead 8 so that the anode terminal section 40 can be connected directly to the tantalum lead 8. Alternatively, instead of using the connector 20, the tantalum lead 8 may be led out from the capacitor element 4 at a location closer to the anode terminal section 40 so that they can be connected directly each other. Another alternative is to use an Ω-shaped connector, which is placed over the tantalum lead 8 from above so as to bring it in contact with the lead 8 with the lower ends of the legs contacting the anode terminal section 40.

What is claimed is:

1. A method of manufacturing chip capacitors comprising the steps of:

preparing a terminal frame including a plurality of terminal section pairs arranged in rows and columns, each terminal section pair comprising a flat anode terminal section and a flat cathode terminal section disposed in the same plane with tip ends thereof facing each other with a predetermined spacing disposed therebetween;

preparing a plurality of capacitor elements each having a cathode layer disposed on an outer surface thereof and having an anode lead extending therefrom;

placing one of said capacitor elements in relation to each terminal section pair, connecting the anode lead of the capacitor element to one of opposing major surfaces of the anode terminal section of that terminal section pair, and connecting the cathode layer of the capacitor element to one of opposing major surfaces of the cathode terminal section of the same terminal section pair lying substantially in the same plane as said one major surface of the anode terminal section;

coating said terminal frame and said capacitor elements placed thereon with a resin to encapsulate said capacitor elements therein, with at least a portion of the other major surface of each of said anode terminal sections exposed and with at least a portion of the other major surface of each of said cathode terminal sections exposed; and cutting said coated terminal frame and said capacitor elements coated with said resin so as to sever said anode terminal sections and said cathode terminal sections from said terminal frame.

2. The method according to claim 1 wherein said step of cutting comprises forming slots between adjacent ones of said capacitor elements.

3. The method according to claim 1 wherein said step of placing comprises disposing an insulator on a tip end portion of each of said anode terminal sections, and bringing said cathode layer of each of said capacitor elements into contact with said insulator on said tip end portion of said anode terminal section and an associated one of said cathode terminal sections.

\* \* \* \* \*